(12) United States Patent
Tighe (10) Patent No.: US 7,601,451 B2
(45) Date of Patent: Oct. 13, 2009

(54) VARIABLE ACTIVE AREA FOR FUEL CELL

(75) Inventor: Thomas W Tighe, Bloomfield, NY (US)

(73) Assignee: GM Global Technologies Operations, Inc.

( * ) Notice: Subject to any disclaimer, the term of this patent is extended or adjusted under 35 U.S.C. 154(b) by 1025 days.

(21) Appl. No.: 10/842,789

(22) Filed: May 11, 2004

(65) Prior Publication Data

US 2005/0255366 A1 Nov. 17, 2005

(51) Int. Cl.
    *H01M 2/14* (2006.01)
(52) U.S. Cl. .......................................... 429/38; 429/39
(58) Field of Classification Search ................... 429/38, 429/39
    See application file for complete search history.

(56) References Cited

U.S. PATENT DOCUMENTS

| | | | |
|---|---|---|---|
| 6,218,038 B1 * | 4/2001 | Oko et al. ................... 429/34 |
| 6,419,046 B1 * | 7/2002 | Cubbison ................... 182/129 |
| 6,420,061 B1 * | 7/2002 | Fujii et al. ................... 429/26 |
| 6,422,434 B1 * | 7/2002 | Lammond Wass et al. .. 222/571 |
| 2003/0049503 A1 * | 3/2003 | Ballantine et al. ............. 429/22 |
| 2003/0171721 A1 * | 9/2003 | Enomoto et al. ............ 604/247 |
| 2003/0207165 A1 | 11/2003 | Skala et al. |
| 2004/0146770 A1 * | 7/2004 | Colton ........................ 429/34 |

* cited by examiner

*Primary Examiner*—Patrick Ryan
*Assistant Examiner*—Muhammad Siddiquee
(74) *Attorney, Agent, or Firm*—Harness, Dickey & Pierce, P.L.C.

(57) ABSTRACT

An electrochemical fuel cell stack assembly having a variable active area. The fuel cell stack uses a blocking member to selectively block the flow of reactants through channels of the flow fields of the anode and/or cathode flow paths. Blocking portions of the flow paths allows the fuel cell stack to maintain reactant flow velocities in a desired predetermined range. This enables the control and variation of the active area of the fuel cell, enhancing water management of the fuel cell stack.

26 Claims, 8 Drawing Sheets

VARIABLE ACTIVE AREA FOR FUEL CELL

FIELD OF THE INVENTION

The present invention relates to an electrochemical fuel cell stack, and more particularly, to a variable active area for the fuel cells within the fuel cell stack.

BACKGROUND OF THE INVENTION

Fuel cells can be used as a power source in many applications. For example, fuel cells have been proposed for use in electrical vehicular power plants to replace internal combustion engines. In proton exchange membrane (PEM) type fuel cells, hydrogen is supplied as the anode reactant to the anode of the fuel cell and oxygen, or air, is supplied as the cathode reactant to the cathode of the fuel cell. PEM fuel cells include a membrane electrode assembly (MEA) comprising a thin, proton transmissive non-electrically conductive, solid polymer electrolyte membrane having the anode catalyst on one face and the cathode catalyst on the opposite face. The MEA is sandwiched between a pair of non-porous, electrically-conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged electrically in series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such, these MEAs are relatively expensive to manufacture and require certain conditions, including proper water management and humidification and control of catalyst fouling constituents such as carbon monoxide (CO), for effective operation.

The electrically conductive plates sandwiching the MEAs may contain a reactant flow field for distributing the fuel cell's gaseous reactants over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels. In the fuel cell stack, a plurality of cells are stacked together electrically in series while being separated one from the next by a gas impermeable, electrically conductive bipolar plate. Water (also known as product water) is generated at the cathode electrode based on the electrochemical reactions between hydrogen and oxygen occurring within the MEA. Efficient operation of a fuel cell depends on the ability to provide proper and effective water management in the system.

The active area of the fuel cell(s) and flow fields are sized for the maximum power output of the fuel cell stack. During full or high power operation, the cathode reactant flow velocity is sufficient to transport liquid water from the flow field. During times of reduced power output, however, the quantity (mass flow rate) of anode and cathode reactants flowing into the active area and associated flow fields is reduced and the resulting reduced flow velocity may not be sufficient to transport the liquid water from the active area and flow fields. To compensate, the quantity of cathode reactant flowing into the flow fields could be increased beyond that required in order to provide the velocity necessary to remove the water, however, this would require a significant excess quantity of cathode reactant. Supplying significant excess cathode reactant consumes energy and decreases the fuel cell system efficiency, and may also have an adverse effect on the humidification and operation of the MEA. Therefore, it would be advantageous to maintain the cathode reactant flow velocity at a rate that transports liquid water from the active area and flow fields while minimizing and/or eliminating excessive cathode reactant flow.

SUMMARY OF THE INVENTION

The present invention provides an electrochemical fuel cell stack assembly having a variable active area. The fuel cell stack uses a blocking member to selectively block the flow of reactants through channels of the flow fields of the anode and/or cathode flow paths. Blocking portions of the flow paths allows the fuel cell stack to maintain reactant flow velocities in a desired predetermined range. This enables the control and variation of the active area of the fuel cell, enhancing water management of the fuel cell stack.

In one aspect of the present invention, a fuel cell assembly is disclosed. The fuel cell assembly has a plurality of fuel cells arranged in a stacked formation. There is an anode reactant flow path having a plurality of reactant flow fields through which anode reactant flows, and a cathode reactant flow path having a plurality of reactant flow fields through which a cathode reactant flows. At least one blocking device selectively blocks the flow through a portion of at least one of the flow fields in the anode and cathode flow paths. The blocking of flow is operable to vary the active area of at least one of the fuel cells.

In another aspect of the present invention, a method of operating a fuel cell stack is disclosed. This method includes determining an operational parameter of a fuel cell stack and varying an active area of at least one of the flow fields in at least one of the anode and cathode flow paths in response to the operational parameter.

In yet another aspect of the present invention, a method of maintaining flow velocities within a predetermined range in an active area of a cathode flow field in an electrochemical fuel cell stack is disclosed. The method includes: (1) determining an operational parameter of the fuel cell; and (2) maintaining a flow velocity in the cathode flow field within the predetermined range by blocking a portion of the cathode flow field with a blocking member based on the operational parameter.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein:

FIGS. 6A and 6B are enlarged views of the cathode exit header of the bipolar plate of FIG. 3A illustrating a preferred embodiment of a gate-type blocking member according to the principles of the present invention in a closed state and an open state, respectively;

DETAILED DESCRIPTION OF THE PREFERRED EMBODIMENTS

The following description of the preferred embodiments are merely exemplary in nature and are in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

In order to achieve stable operation of a fuel cell stack over a wide range of loads, it is necessary to properly manage water that is produced by the cathodic oxygen reduction reaction which occurs during operation. A key water management concern is the transportation and prevention of undesired accumulation of water in a fuel cell. Typically, product water is removed using the cathode reactant stream flowing through the cell. Generally, increased cathode reactant velocity enables the removal of an increased amount of water from the fuel cell. Of concern is the ability of the flow field channels of a fuel cell to expel water at various levels of gas (or fluid) velocities and operating conditions. Under high power loads, gas flow through the flow fields typically removes a sufficient amount of product water away from the MEA. During operation of a fuel cell at low power loads with the associated lower gas velocities, however, product water may accumulate in certain channels or regions of the reactant flow fields. This is particularly troublesome on the cathode side.

Under low load conditions, increased water accumulation in the flow fields contributes to low performing cell behavior, wherein one or more cells within a stack experiences a rapid drop in voltage. In this case, the gas inertia may not be sufficient to remove the necessary amount of water or to expel large liquid slugs around curves or bends toward the cathode exhaust header. This excessive amount of water may result in entire channels being starved of oxygen. Water accumulation may also lead to flow maldistribution and the potential instability of a portion of a fuel cell. The present invention discloses the use of a blocking member in an electrochemical fuel cell that enables efficient integrated water management. Such water management includes varying an active area of the fuel cell with the blocking member. As used herein, varying an active area includes increasing or decreasing the size of the active area of a fuel cell. Under low load conditions, portions of the flow fields are blocked or non-active, thereby decreasing the active area and increasing the velocity of fluid flow through the non-blocked or active channels for the same mass flow rate. The blocking enables proper water management of the fuel cell stack.

Figure 1:
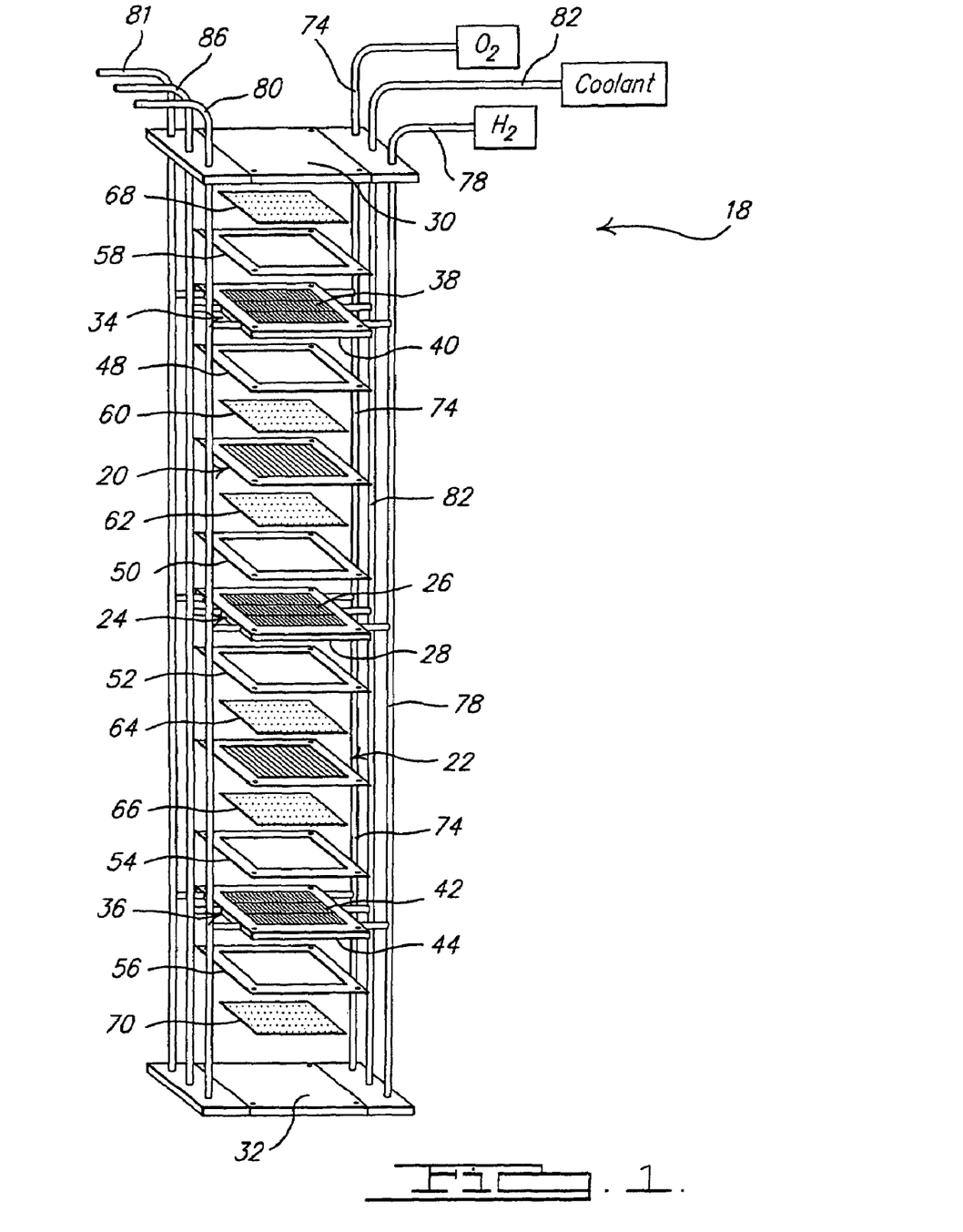
FIG. 1 is a schematic, exploded, isometric, illustration of a liquid-cooled PEM fuel cell stack (only two cells shown)

To gain a better understanding of the present invention, an exemplary fuel cell stack 18 where the present invention may be employed is shown in FIG. 1. It should be understood that the discussions and descriptions associated with fuel cell stack 18 are also applicable to individual fuel cells and vice versa, and are within the scope of the present invention. FIG. 1 depicts two individual proton exchange membrane (PEM) fuel cells connected to form a stack 18 having a pair of membrane-electrode-assemblies (MEAs) 20, 22 separated from each other by an electrically conductive, liquid-cooled, bipolar separator plate conductive element 24. The MEAs form the active area of each fuel cell. An individual fuel cell, which is not connected in series within a stack, has a separator plate 24 with a single electrically active side. In a stack, a preferred bipolar separator plate 24 typically has two electrically active sides 26, 28 within the stack, each active side 26, 28 respectively facing a separate MEA 20, 22 with opposite charges that are separated, hence the so-called "bipolar" plate.

The MEAs 20, 22 and bipolar plate 24 are stacked together between stainless steel clamping terminal plates 30, 32 and end contact fluid distribution elements 34, 36. The end fluid distribution elements 34, 36, as well as both working faces or sides 26, 28 of the bipolar plate 24, contain a plurality of lands adjacent to grooves or channels on the active faces 38, 40, 26,

28, 42, and 44 and form flow fields for distributing anode and cathode reactants (i.e., $H_2$ and $O_2$/air) to the MEAs 20, 22. Nonconductive gaskets or seals 48, 50, 52, 54, 56, and 58 provide seals and electrical insulation between the several components of the fuel cell stack. Gas-permeable conductive diffusion media 60, 62, 64, and 66 press up against the electrode faces of the MEAs 20, 22. Additional layers of conductive media 68, 70 are placed between the end contact fluid distribution elements 34, 36 and the terminal collector plates 30, 32 to provide a conductive pathway therebetween when the stack is compressed during normal operating conditions. The end contact fluid distribution elements 34, 36 press up against the diffusion media 60, 68 and 66, 70 respectively.

Cathode reactant in the form of $O_2$/air is supplied to the cathode flow fields of fuel cell stack 18 from a storage tank or from the ambient via appropriate supply plumbing 74. Similarly, anode reactant in the form of $H_2$ is supplied to the anode flow fields of fuel cell stack 18 from a storage tank, a methanol or gasoline reformer, or the like, via appropriate supply plumbing 78. Exhaust plumbing 80, 81 for the anode and cathode effluents produced in the respective anode and cathode flow fields of fuel cell stack 18 are also provided. Supply and exit or exhaust plumbing 74, 78, 80, 81, 82, and 86 take the form of headers within fuel cell stack 18. Additional supply plumbing 82 is provided for circulating coolant through bipolar plates 24 and end plates 30, 32 and out via exit plumbing 86.

Figure 2:
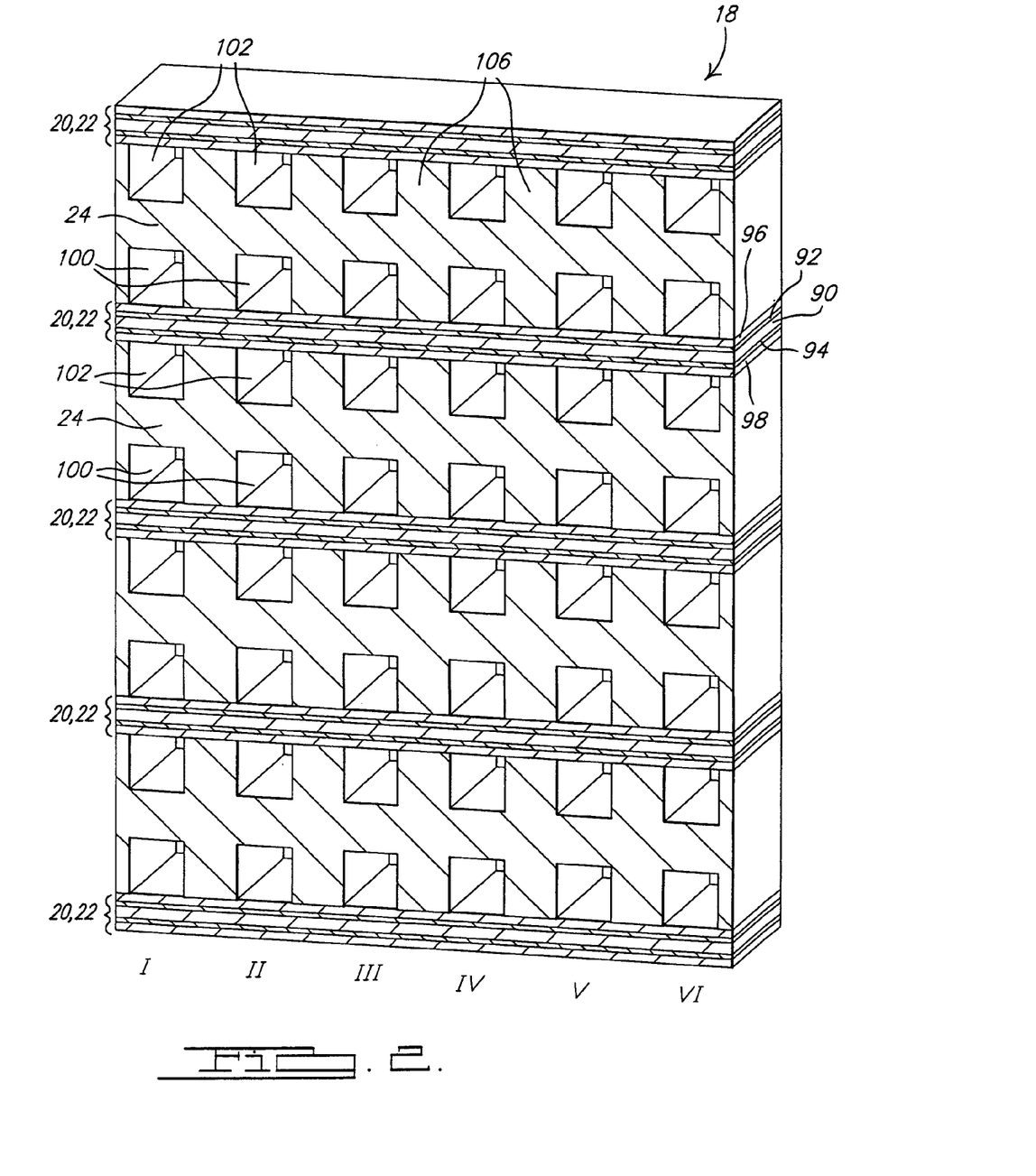
FIG. 2 is a partial cross-sectional view of a fuel cell stack showing four bipolar plates and five MEAs from the perspective of the inside of the cathode outlet header looking into the fuel cell flow fields.

With reference to FIG. 2, each MEA 20, 22 includes a membrane 90 sandwiched between an anode catalyst layer 92 and a cathode catalyst layer 94. An anode diffusion media 96 and a cathode diffusion media 98 are interposed between MEA 20, 22 and the bipolar plate 24. As shown, $H_2$ flow channels 100 forming the anode side $H_2$ flow field lie immediately adjacent the anode diffusion media 96 and are in direct fluid communication therewith. Similarly, $O_2$ flow channels 102 forming the cathode side $O_2$ flow field lie immediately adjacent the cathode diffusion media 98 and are in direct fluid communication therewith. The membrane 90 is preferably a proton exchange membrane (PEM) and the cell having the PEM is referred to as a PEM fuel cell.

During fuel cell operation, the anode reactant stream flows into an inlet side of the anode side flow field and, concurrently, the cathode reactant stream flows into an inlet side of the cathode side flow field. $H_2$ flows through anode diffusion media 96 and the presence of the anode catalyst 92 causes the $H_2$ to break into two protons ($H^+$), freeing an electron. The membrane 90 allows the protons to flow through while preventing electron flow therethrough. Thus, the protons migrate across the membrane to cathode side 94. The electrons travel from the anode side to an electric circuit (not shown) for enabling work to be performed (i.e., rotation of an electric motor).

Catalyst particles within the cathode side 94 facilitate a reaction between the protons ($H^+$) and oxygen ($O_2$) to form product water within the electrode. During operation, the cathode diffusion media 98 may become saturated with water generated on the cathode face 94 of the MEA 20, 22. Saturation of the diffusion media 98 impedes or prevents oxygen from reaching the cathode face 94 of the MEA 20,22 and may cause the fuel cell's performance to be compromised, or be halted altogether. Thus, as product water is generated, the fluid flow into the porous cathode material must simultaneously be maintained. Otherwise, the electrode has the potential to "flood" with liquid, which can stop the electron production in that cell. If one fuel cell of the fuel cell stack 18 becomes inoperable, it may adversely impact the entire fuel cell stack as they are electrically connected in series.

Water management of a fuel cell requires a balance of many factors. Water or humidity is required to ensure each fuel cell PEM 90 maintains good proton conductivity. In addition to the product water generated at the cathode 94 of the fuel cell, water is also carried from the anode 92 to the cathode 94 via protons moving through the polymer electrolyte 90. If the cathode side 94 holds more water than the anode side 92, water may back diffuse from the cathode to the anode. Additionally, water may be supplied by using a humidified hydrogen supply or an external humidification source. Typically, water is removed by the circulating anode reactant stream or by the cathode effluent stream leaving the fuel cell. During times of reduced power output, however, the quantity (mass flow rate) of anode and cathode streams flowing into the active area and associated flow fields is reduced and may not be sufficient to transport the liquid water from the active area.

Figure 3A:
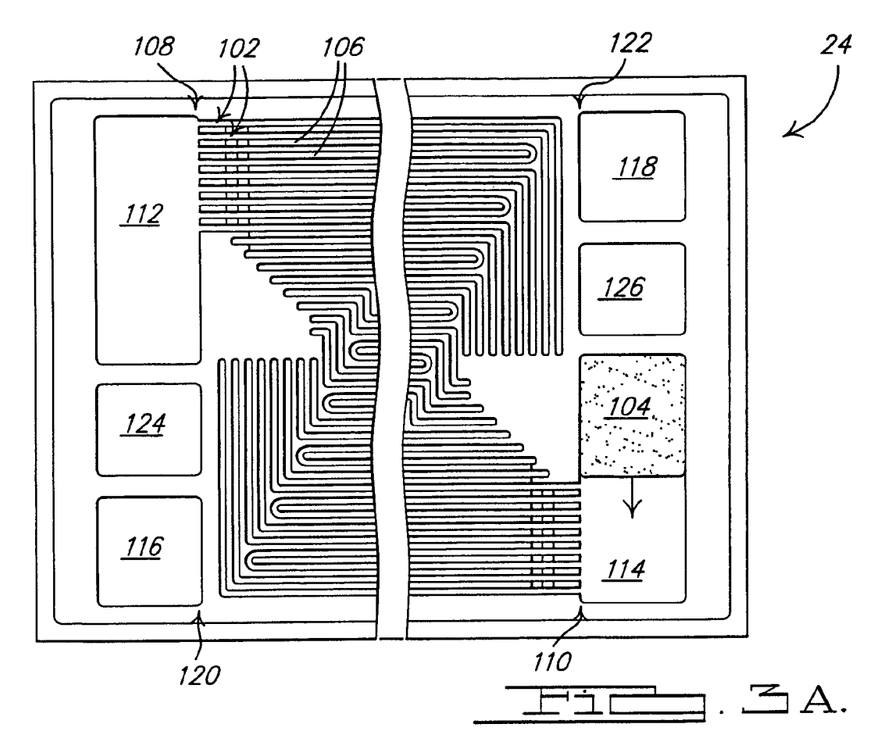
FIG. 3A is a partial plan view of an exemplary bipolar plate of the present invention illustrating a preferred embodiment of a sliding blocking member in an open state.

FIG. 3A depicts a bipolar plate 24 operable for use with a blocking member according to the present invention. The bipolar plate 24 has a cathode flow field having multiple channels 102 through which the cathode reactant gas flows. As previously discussed, flow channels 102 are defined by a plurality of lands 106 or corresponding grooves therebetween. Flow field patterns will vary by bipolar plate design. Cathode reactant flows through a cathode inlet header 112 and is delivered to flow channels 102 of the flow field. Flow channels 102 extend from a first end 108 of the bipolar plate in fluid communication with cathode inlet header 112, to a second end 110 in fluid communication with a cathode outlet header 114. Cathode outlet header 114 transports spent cathode reactant, or cathode effluent out of the stack. The opposite side (not shown) of bipolar plate 24 has an anode flow field having multiple channels 100 through which the anode reactant gas flows. Anode reactant flows through an anode inlet header 116 and is delivered to each flow channel 100 of the flow field. Flow channels 100 extend from a first end 120 of the bipolar plate in fluid communication with the anode inlet header 116, to a second end 122 in fluid communication with an anode outlet header 118. Bipolar plate 24 additionally has internal cooling channels (not shown). The coolant will enter through a coolant inlet header 124 and similarly travel through appropriate flow channels to a coolant outlet header 126. Headers 112, 114, 116, 118, 124, and 126 extend through each fuel cell along the periphery for the height of the fuel cell stack.

During low power operation of a fuel cell stack the quantity of anode and cathode reactants flowing through the flow fields is decreased versus normal high power operation. Since less reactants are required, the velocities of the reactant streams through the flow fields of the fuel cell stack will decrease. This reduces the ability to remove product water from the fuel cell stack via the reactant streams flowing through the flow fields. As a result, product water may accumulate and affect the performance of the fuel cells. Low power operation of a fuel cell stack requires a smaller active area than during high power operation. By blocking certain flow channels 102 while maintaining the same mass flow rate of the reactant stream, an increased velocity of the reactant stream flowing through the non-blocked, or active, channels can be realized. The increased velocity prevents the undesirable product water accumulation that may occur during low power operation and unimpeded reactant stream flow.

According to a first preferred embodiment of the present invention, a blocking member 104 is used to block or reduce the flow of reactant through portions of the cathode flow path in the fuel cells, as shown in FIG. 3A. The blocking results in an increased velocity of cathode reactant through the non-blocked regions for the same mass flow rate. The increased velocity enables the proper transportation and removal of product water from the active area of the flow fields of the fuel cell stack. This also effectively reduces the active area to meet the power demand placed on fuel cell stack 18 and enables optimization of the active area for the operating condition.

Blocking member 104 is a non-conductive material so as to prevent current flow between the bipolar plates via the blocking member. The blocking member 104 can be made from a variety of materials. For example, it may comprise a non-metallic material, or a metallic material having a non-conductive coating, such as commercially available Teflon®, or a similar rubberized coating.

Blocking member 104 is operable to block flow through at least a portion of the flow field of the cathode flow path. Blocking member 104 may be located inside an inlet header 112 or an outlet header 114 to block the inlet or outlet of the flow channels 102, respectively. As shown in FIG. 3A, blocking member 104 is preferably located in the cathode outlet header 114 of the fuel cell stack. By blocking flow channels at the outlet header 114, the blocking member 104 may be used for back pressure control. This back pressure control may use suitable closed loop feedback from a pressure reading from the cathode inlet header 112 to maintain a desired pressure drop across the flow field. Blocking member 104 blocks the flow through a given number of flow channels 102 thereby increasing flow velocities within the channels that remain open.

Referring to FIG. 2, a cross sectional view from the perspective of the inside of the cathode outlet header looking into the flow field direction is shown. Although various blocking member designs may accommodate blocking flow through various channels or portions of the cathode or anode flow fields, preferred blocking members are designed to block flow through the same flow channels of each flow field. As depicted in FIG. 2, as the blocking member is moved along the header from left to right, each channel in column I is blocked, followed by column II, column III, up to and including column VI, and so on. It is preferable to block the same number of channels in each fuel cell, thereby keeping the active area of each fuel cell, and the corresponding energy output, about the same for each fuel cell in the stack. The blocking member is operable to block or unblock an increasing number of channels, preferably one channel at a time, although such resolution is not required as the blocking member is moved. This enables blocking flow through a given number of channels to provide a desired flow velocity in the channels that remain open. The flow velocity is selected to enable the removal of product water from the flow field.

Figure 3B:
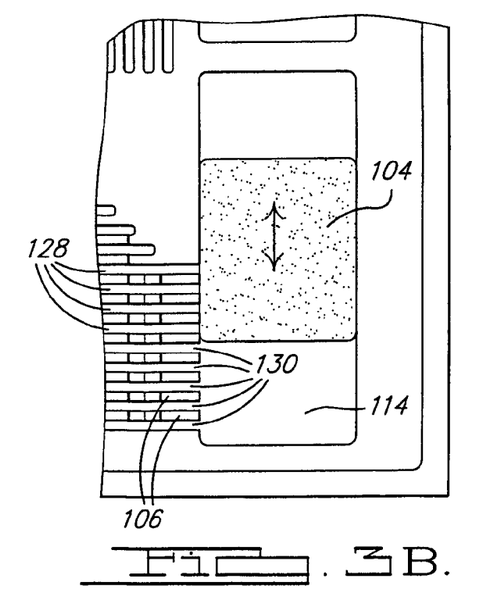
FIG. 3B is an enlarged view of the cathode exit header of the bipolar plate of FIG. 3A illustrating the sliding blocking member in a partially closed state.

As shown in FIGS. 3A and 3B, blocking member 104 is operable to slide across header 114, thereby blocking a desired number of channels or portion of the cathode flow path. This results with some adjacent channels 128 being blocked while other adjacent channels 130 are active and remain in fluid communication with outlet header 114. Blocking member 104 extends with the header, running adjacent to each fuel cell of the fuel cell stack 18 and is connected to and supported by the end plates 30, 32. The sliding movement enables the blocking and unblocking of an increasing number of adjacent flow channels 102 of the flow fields, depending upon the specific flow path design.

Figure 4A:
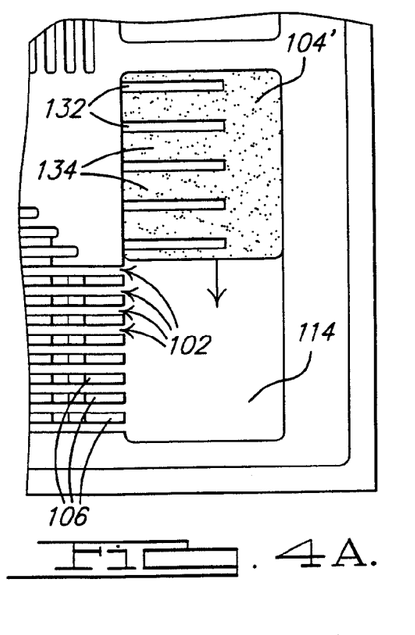
FIGS. 4A and 4B are enlarged views of the cathode exit header of the bipolar plate of FIG. 3A illustrating an alternate embodiment of a sliding blocking member in an open state and partially closed state, respectively.
Figure 4B:
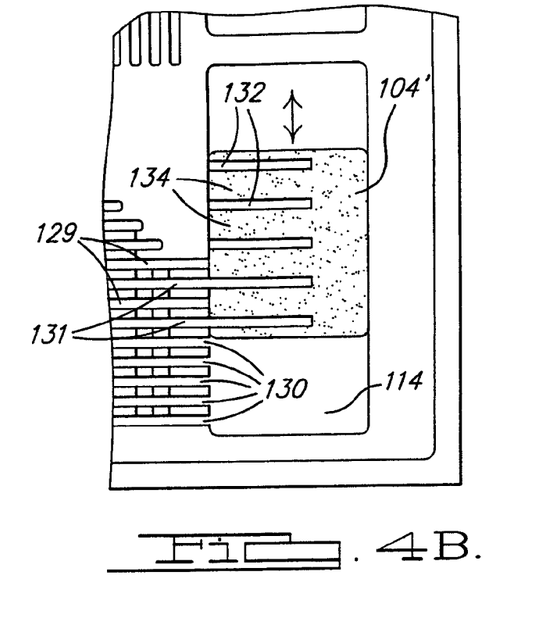

In an alternate embodiment, as shown in FIGS. 4A and 4B, sliding blocking member 104' has a plurality of alternating flow channels 132 and blocking ribs 134. This embodiment enables blocking flow through non-adjacent flow channels 129 of the flow field, while other non-adjacent channels 131 and non-blocked channels 130 remain active and in fluid communication with outlet header 114. It should be appreciated that various designs of the flow fields 26, 28 in combination with different arrangements of flow channels 132 and blocking ribs 134 in the blocking member enable selection of a desired active area for the fuel cells.

Figure 5:
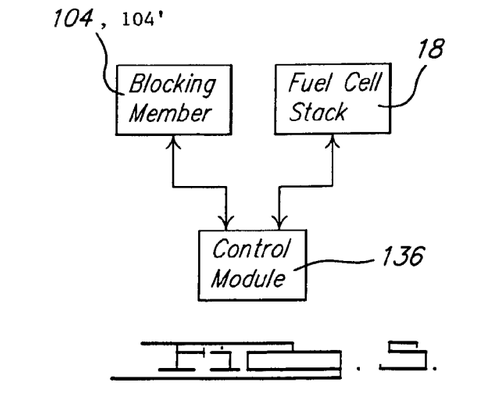
FIG. 5 is a schematic block diagram showing a control module system used to control the blocking member according to the principles of the present invention.
Figure 5A:
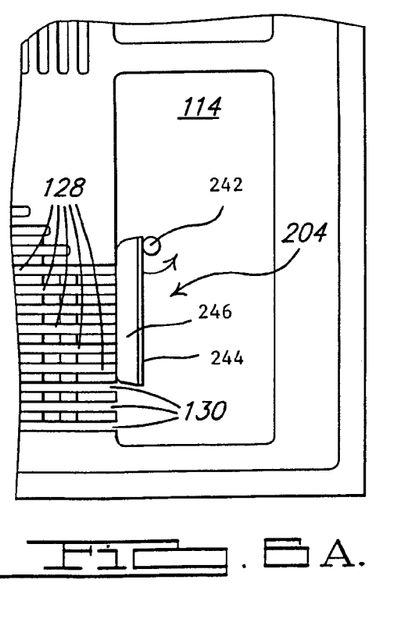
Figure 5B:
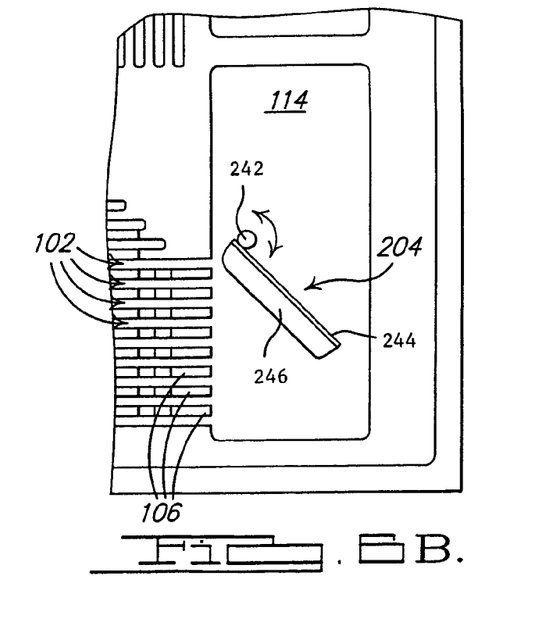

The movement of the blocking member is mechanically controlled by a control module 136, as shown in FIG. 5. Control module 136 is in communication with fuel cell stack 18 and blocking member 104, 104'. Control module 136 monitors select operational parameters of fuel cell stack 18, such as the power demand placed on the fuel cell stack, interprets the information, and directs the movement of the blocking member 104, 104' in response to the operational parameters. Control module 136 can thereby vary the active area of the fuel cell stack and maintain the flow velocity through the active channels of the flow field within a predetermined range of flow velocities based on the operational parameters. The active area may be increased or decreased depending on the operational parameters. Control module 136 may use various logic to interpret the operational parameters and relate changes in such parameters to a mechanical movement of blocking member 104, 104' which results in an increased or decreased active area of the fuel cell. Some common methods include, but are not limited to, movement based upon empirical data, an algorithm, closed loop feedback, other signals indicating an increase or decrease in power demand, and the like.

In a second preferred embodiment of the present invention, as shown in FIGS. 6A and 6B, blocking is accomplished with a rotating gate-type blocking member 204. Blocking member 204 operates in an "on/off" fashion thereby blocking a fixed number of channels 102 when engaged, and enabling unobstructed fluid flow when not engaged. Blocking member 204 is supported and engaged with a rotating shaft 242 for simple on/off control. Blocking member 204 and shaft 242 extend throughout header 114 and connect to the end plates 30, 32. The rotation of shaft 242 controls the position of blocking member 204. Blocking member 204 is sized to block a predetermined number of adjacent flow channels 102 across the flow field when engaged, providing a desired reduced active area of the fuel cells. Blocking member 204 has a stiff back plate 244 made of PTFE or of a material with qualities similar to PTFE. The portion 246 of blocking member 204 that engages with the flow channels is made of a non-conductive low durometer rubber, or equivalent deformable material operable to seal and block flow from the channels 102 exiting to header 114. Blocking member 204 can be controlled by control module 136.

Figure 7A:
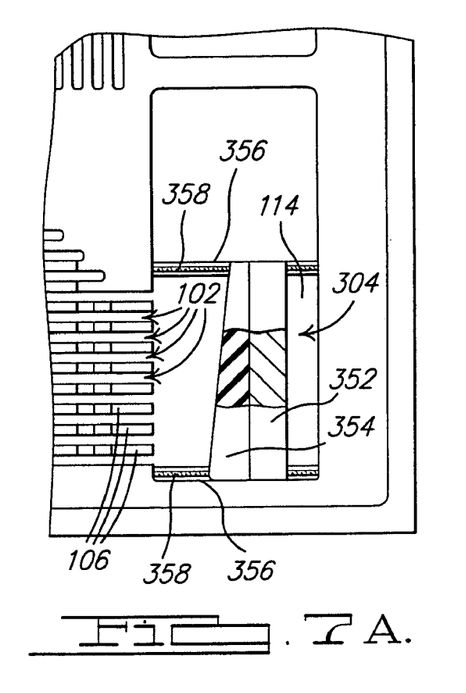
FIGS. 7A and 7B are enlarged views of the bipolar plate of FIG. 3A illustrating a preferred embodiment of a tapered face blocking member located in tracks of the cathode exit header and having a screw-type actuator according to the principles of the present invention in an open state and a partially closed state, respectively.
Figure 7B:
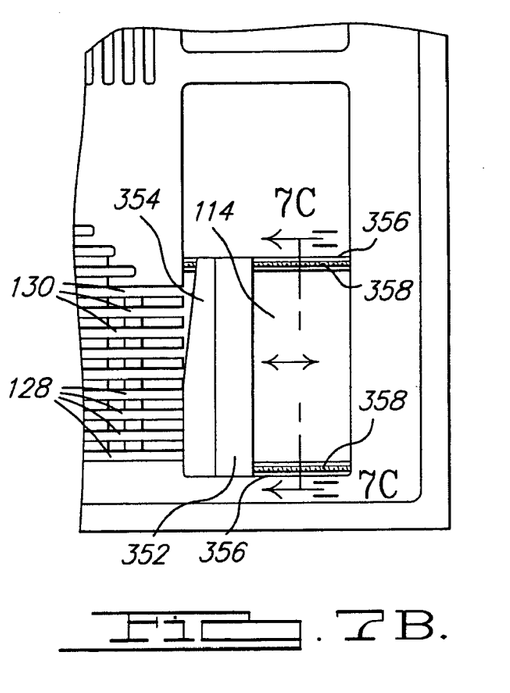
Figure 7C:
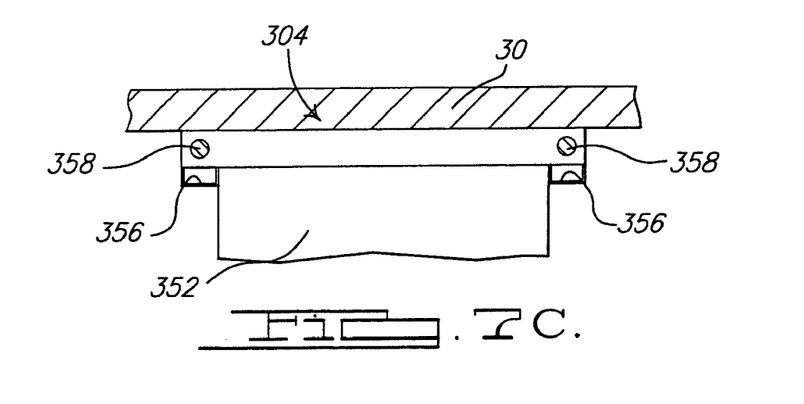
FIG. 7C is a partial cross sectional view of the blocking member of FIG. 7B taken along the line 7C-7C of FIG. 7B.

In a third preferred embodiment of the present invention, as shown in FIGS. 7A, 7B, and 7C, a blocking member 304 having a deformable tapered face is used. The tapered face blocking member 304 has a stiff back plate 352 and a tapered member 354 made of a non-conductive, low durometer rubber or equivalent deformable material. To block flow through channels 102, blocking member 304 is moved toward channels 102. As blocking member 304 contacts individual channels 102, tapered member 354 deforms and seals the channel. Tapered member 354 blocks and seals an increasing number adjacent channels 102 upon the increased application of pressure caused by movement of blocking member 304 toward channels 102. Blocking member 304 is mounted in a set of tracks 356 fixed in the end plates 30, 32 and moves in a direction toward and away from channels 102. As shown in FIG. 7C, blocking member 304 is attached to tracks 356 mounted in top end plate 30. Movement of blocking member 304 is accomplished using rotatable threaded rods 358 engaged with blocking member 304. Blocking member 304 is moved toward or away from channels 102 by rotating the rods 358, and can be controlled by control module 136.

Figure 8A:
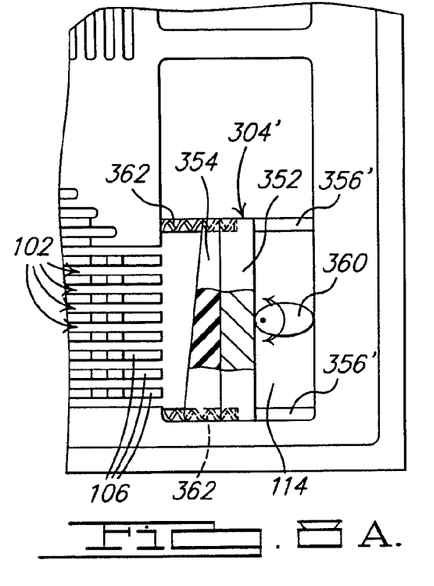
FIGS. 8A and 8B are enlarged views of the tapered face blocking member of FIGS. 7A-C having a cam-type actuator in an open and partially closed state, respectively.
Figure 8B:
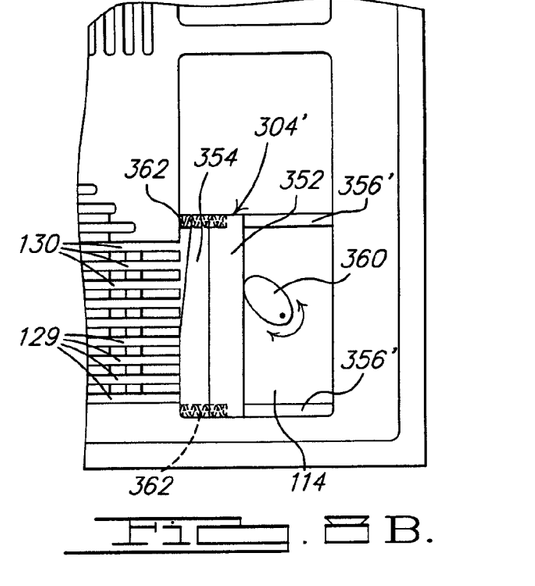

In an alternate embodiment, as shown in FIGS. 8A and 8B, tapered blocking member 304' is activated through a camming member 360. Blocking member 304 is mounted in tracks 356' fixed in the end plates 30, 32. Camming member 360 is operable to rotate and apply pressure to blocking member 304'. Increasing the pressure results in an increased number of channels 102 being blocked, as shown in FIG. 8B. Upon reverse rotation of the camming member 360, pressure is released, and biasing members 362, such as coil springs positioned in tracks 356', return blocking member 304' to its nominal position, thereby enabling fluid flow throughout all of the channels of the flow field. Control module 136 can be used to control blocking member 304'.

Figure 9A:
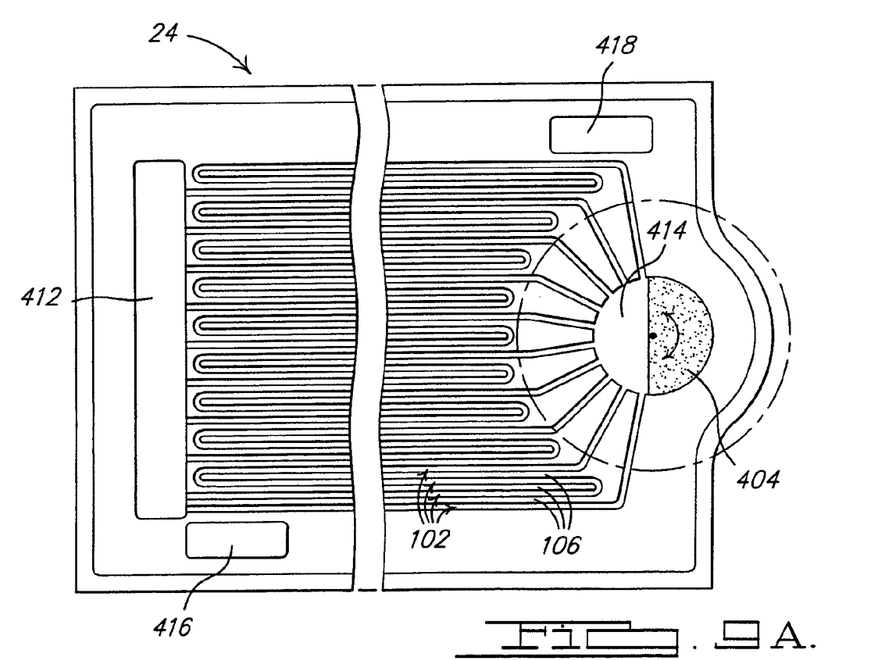
FIGS. 9A and 9B are enlarged views of a different exemplary bipolar plate having a round cathode exit header and a rotary blocking member according to the principles of the present invention in a closed and partially open state, respectively.
Figures 9B, 9C:
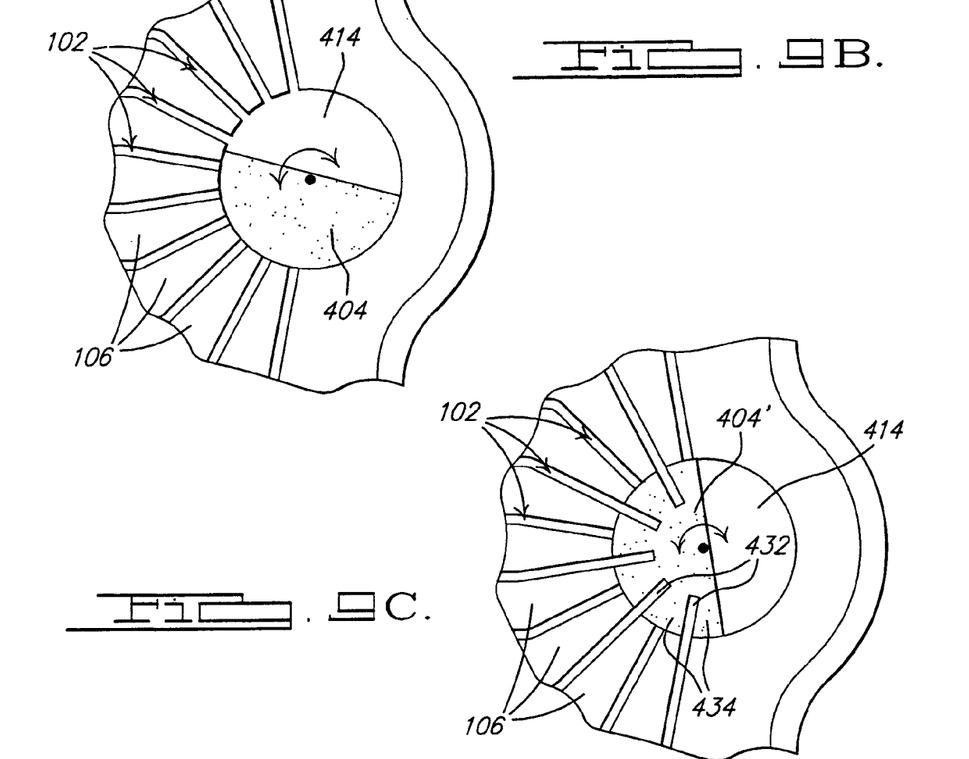
FIGS. 9C and 9D are enlarged views of the round cathode exit header having an alternate embodiment of a rotary blocking member according to the principles of the present invention in two different partially open states.
Figure 9D:
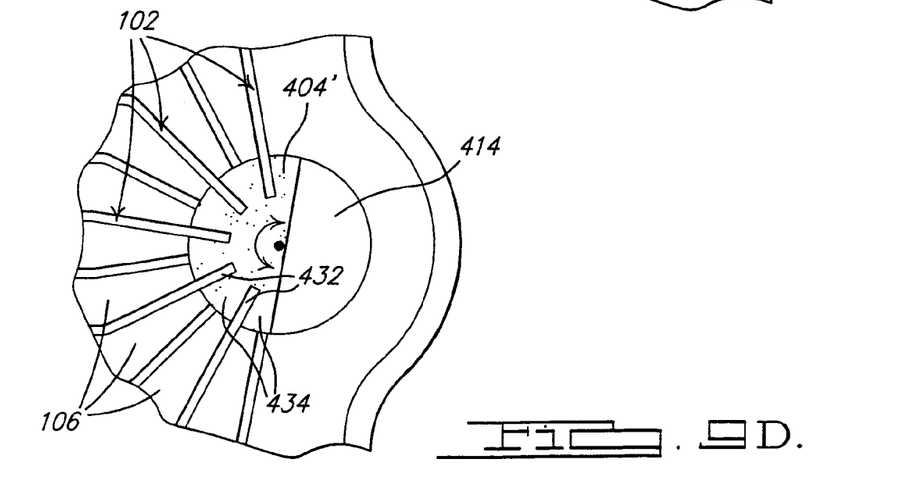

In a fourth preferred embodiment, variable control of the active area is accomplished using a bipolar plate having a substantially circular shaped outlet header 414 and using a rotary-type blocking member 404 located in the header, as shown in FIG. 9A. Comparable to the previously described embodiments, blocking member 404 is supported by the stack end plates 30, 32. Rotation of blocking member 404 is operable to increasingly open or block adjacent flow field channels 102 of the fuel cells in the stack. Blocking member 404 may be rotated to block an entirety of the channels, if so desired. Blocking member 404 may be designed to block cumulative adjacent flow channels, as shown in FIGS. 9A and 9B, or, in an alternate embodiment, blocking member 404' may be designed with a plurality of flow channels 432 and blocking ribs 434, as shown in FIGS. 9C and 9D, or any variation thereof. Blocking member 404' allows the variable active area to alternate to various locations of the fuel cell. This helps prevent excess use and wear in only certain areas of the MEA 20, 22, providing the opportunity for the MEA 20, 22 to wear more evenly throughout the fuel cell.

Figure 10A:
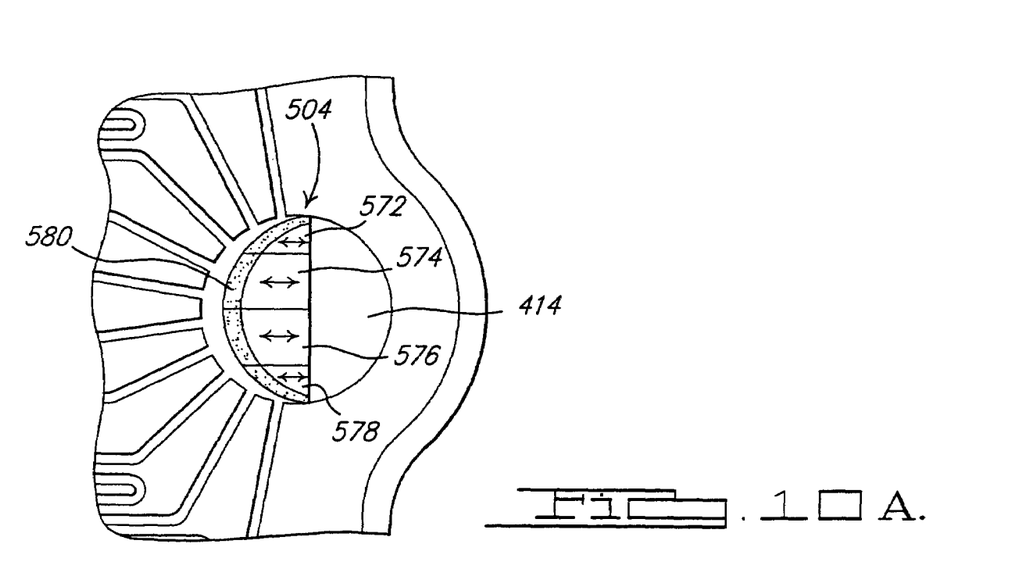
FIGS. 10A and 10B are enlarged views of a round cathode exit header having a multi-gate type blocking member in accordance with the principles of the present invention in an open and partially closed position, respectively.
Figure 10B:
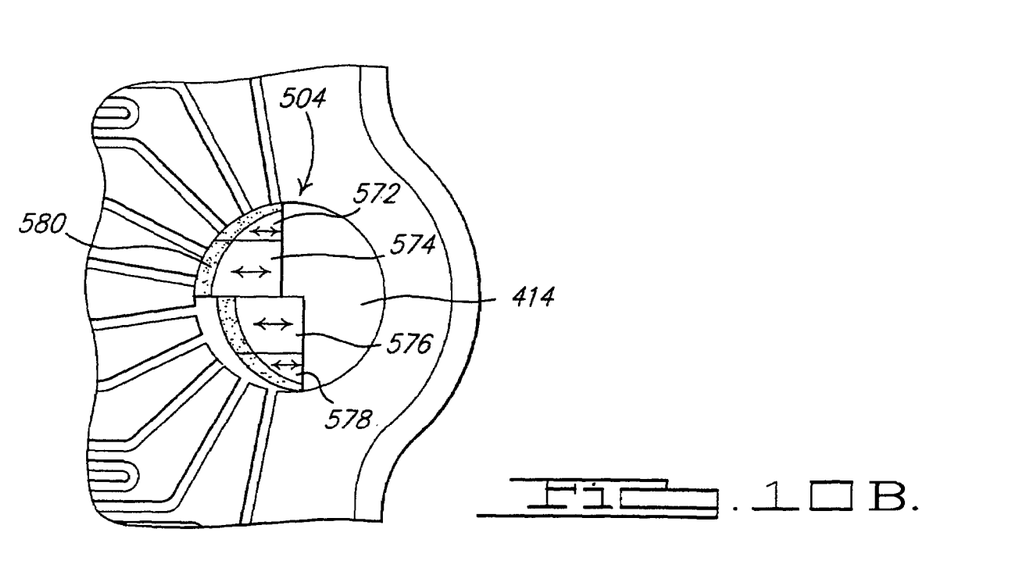

Additional analog control of the blocking members can be achieved by a number of approaches. For example, in another alternate embodiment, as shown in FIGS. 10A and 10B, blocking member 504 has multiple gates or blocking parts 572, 574, 576, 578 to vary and control the active area. Each gate is operable to move toward or away from channels 102 to selectively block different channels and different portions of the flow field. The gate design of this embodiment is similar to the tapered face, wherein a portion 580 is made of low durometer deformable rubber, or the like. Control module 136 can be used to control blocking member 404, 404' and 504.

It should be appreciated that while the present invention is shown and described with reference to blocking flow through the cathode flow path, the various blocking members of the present invention can alternatively and/or additionally be used to block flow in the anode flow path, if so desired. For example, the anode flow can be blocked during periods of reduced power demand to have the anode reactant gas flow through portions of the anode flow field that correspond to the unblocked portions of the cathode flow fields. Furthermore, while the anode flow field does not have the same issues with regard to water management as the cathode side, such blocking may provide additional water removal and transportation through the cathode flow channels, if needed.

It should also be appreciated that while the blocking members of the present invention are shown as blocking discreet flow channels 102, the flow channels 102 that feed into the headers can correspond to discreet sections of the flow fields wherein each section of flow field has multiple flow channels therein. For this configuration, the blocking members are operable to block individual discreet sections, either adjacent sections or non-adjacent sections, as desired. Furthermore, a variety of combinations or configurations of the various blocking members are feasible with the present invention. Additionally, while the blocking of the flow fields is preferred to occur in the outlet header, the blocking members can also be used in the inlet header to prevent flow from entering portions of the flow field. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A fuel cell assembly comprising:
a plurality of fuel cells arranged in a stacked configuration;
an anode reactant flow path including a plurality of anode reactant flow fields through which an anode reactant flows;
a cathode reactant flow path including a plurality of cathode reactant flow fields through which a cathode reactant flows; and
at least one blocking device including at least one blocking member that communicates with and is operable to selectively block flow through a portion of at least one of said flow fields in said anode reactant flow path, said cathode reactant flow path, or both,
wherein blocking of said flow is operable to vary an active area of at least one of said fuel cells, said blocking member rotates to selectively block flow, and the rotating blocking member directly engages with at least one of a flow channel of a flow field and an edge of a fuel cell plate.

2. The fuel cell assembly of claim 1, wherein:
each of said anode reactant flow fields has a plurality of flow channels;
each of said cathode reactant flow fields has a plurality of flow channels; and
said blocking member is operable to selectively block flow through a portion of said flow channels in at least one of said flow fields in at least one of said anode and cathode flow paths.

3. The fuel cell assembly of claim 2, wherein said blocking member is operable to selectively block flow through a portion of said flow channels in each of said flow fields in at least one of said anode and cathode flow paths.

4. The fuel cell assembly of claim 2, wherein said blocking member is operable to selectively block adjacent flow channels in at least one of said flow fields in at least one of said anode and cathode flow paths.

5. The fuel cell assembly of claim 2, wherein said blocking member is operable to selectively block nonadjacent flow channels in at least one of said flow fields in at least one of said anode and cathode flow paths while one or more flow channels are unblocked between said blocked flow channels.

6. A fuel cell assembly comprising:
a plurality of fuel cells arranged in a stacked configuration;
an anode reactant flow path including a plurality of anode reactant flow fields through which an anode reactant flows;
a cathode reactant flow path including a plurality of cathode reactant flow fields through which a cathode reactant flows; and
at least one blocking member operable to selectively block flow through a portion of at least one of said flow fields in said anode reactant flow path, said cathode reactant flow path, or both, wherein blocking of said flow is operable to vary an active area of at least one of said fuel cells, wherein at least one flow field in at least one of said anode and cathode flow paths has a plurality of discrete sections each having a plurality of flow channels, said blocking member is operable to selectively block at least one of said sections of flow channels, and said blocking member is operable to selectively block nonadjacent sections of flow channels while one or more sections of flow channels remain unblocked between said blocked sections.

7. The fuel cell assembly of claim 6, wherein said blocking member is operable to selectively block adjacent sections of flow channels.

8. The fuel cell assembly of claim 6, wherein said blocking member is one of a plurality of adjacent blocking members each independently moveable relative to one another and each operable to selectively block different sections of flow channels independent of a position of other blocking members.

9. The fuel cell assembly of claim 1, wherein said blocking member is operable to selectively block varying portions of at least one of said flow fields in at least one of said anode and cathode flow paths.

10. The fuel cell assembly of claim 1, wherein said blocking member is operable to selectively block a reactant flow from entering said portion of at least one of said flow fields in at least one of said anode and cathode flow paths.

11. The fuel cell assembly of claim 1, wherein said blocking member is operable to selectively block a reactant flow from exiting said portion of at least one of said flow fields in at least one of said anode and cathode flow paths.

12. The fuel cell assembly of claim 1, wherein said blocking member is substantially positioned in a header portion of at least one of said anode and cathode flow paths.

13. The fuel cell assembly of claim 1, wherein said blocking member is operable to selectively block flow through a portion of at least one of said flow fields in said cathode flow path.

14. The fuel cell assembly of claim 6, wherein said blocking member moves linearly to selectively block flow.

15. A fuel cell assembly comprising:
a plurality of fuel cells arranged in a stacked configuration;
an anode reactant flow path including a plurality of anode reactant flow fields through which an anode reactant flows;
a cathode reactant flow path including a plurality of cathode reactant flow fields through which a cathode reactant flows; and
at least one moveable blocking member operable to move back and forth between at least two positions to selectively block flow through a portion of at least one of said flow fields in said anode reactant flow path, said cathode reactant flow path, or both,
wherein blocking of said flow is operable to vary an active area of at least one of said fuel cells, said blocking member has a tapered engaging face operable to deform and selectively block flow, and said tapered engaging face faces said flow field.

16. A fuel cell assembly comprising:
a plurality of fuel cells arranged in a stacked configuration;
an anode reactant flow path including a plurality of anode reactant flow fields through which an anode reactant flows;
a cathode reactant flow path including a plurality of cathode reactant flow fields through which a cathode reactant flows;
at least one blocking member operable to selectively block flow through a portion of at least one of said flow fields in said anode reactant flow path, said cathode reactant flow path, or both; and
a biasing member that biases said blocking member to a non-blocking position and said biasing member continues to bias said blocking member to said non-blocking position while said blocking member is in a blocking position,
wherein blocking of said flow is operable to vary an active area of at least one of said fuel cells.

17. The fuel cell assembly of claim 1, wherein said blocking member is non-conductive.

18. The fuel cell assembly of claim 1, wherein said blocking member is non-metallic.

19. The fuel cell assembly of claim 1, wherein said blocking member has a non-conductive coating.

20. The fuel cell assembly of claim 15, wherein the tapering engaging face tapers away from said flow field such that as said blocking member is moved toward said flow field increasing contact of said tapering engaging face occurs along with increased blocking.

21. The fuel cell assembly of claim 16, wherein said biasing member is a spring.

22. The fuel cell assembly of claim 16, wherein said biasing member constantly biases said blocking member toward said non-blocking position.

23. The fuel cell assembly of claim 1, wherein the blocking member is disposed in a manifold.

24. The fuel cell assembly of claim 1, wherein the blocking member directly engages with the flow channel.

25. The fuel cell assembly of claim 1, wherein the blocking member directly engages with the edge of a plate.

26. The fuel cell assembly of claim 8, wherein the independent operation of the blocking members allows for different sections of flow channels to be selectively blocked in differing sequences.

* * * * *